United States Patent
Bielecki et al.

(12)

(10) Patent No.: US 6,746,062 B2
(45) Date of Patent: Jun. 8, 2004

(54) COLLAPSIBLE GRILLING SPATULA

(76) Inventors: Elizabeth Bielecki, 505 Gentle Breeze Ter., Carpentersville, IL (US) 60110; Anthony Bielecki, 505 Gentle Breeze Ter., Carpentersville, IL (US) 60110

(*) Notice: Subject to any disclaimer, the term of this patent is extended or adjusted under 35 U.S.C. 154(b) by 0 days.

(21) Appl. No.: 10/175,473

(22) Filed: Jun. 19, 2002

(65) Prior Publication Data

US 2003/0234547 A1 Dec. 25, 2003

(51) Int. Cl.[7] .................................................. A47J 43/28
(52) U.S. Cl. ................................................ 294/7; 16/422
(58) Field of Search .......................... 294/7, 8, 10, 49, 294/51, 53.5, 57; 16/422

(56) References Cited

U.S. PATENT DOCUMENTS

| | | | | |
|---|---|---|---|---|
| 582,852 A | * | 5/1897 | Dodge | 294/8 |
| 778,904 A | * | 1/1905 | Seffens | 294/8 |
| 2,063,432 A | * | 12/1936 | Greene et al. | 294/7 |
| 2,193,341 A | * | 3/1940 | Mehringer | 294/7 |
| 2,728,598 A | * | 12/1955 | Szillage | 294/53.5 |
| 4,559,726 A | * | 12/1985 | Moisan | 37/267 |
| 5,551,741 A | * | 9/1996 | LaBoccetta | 294/7 |

FOREIGN PATENT DOCUMENTS

| | | | | |
|---|---|---|---|---|
| GB | 125849 | * | 5/1919 | 294/7 |

* cited by examiner

*Primary Examiner*—Dean J. Kramer
(74) *Attorney, Agent, or Firm*—Anne M. Johnson

(57) ABSTRACT

A collapsible spatula for cooking over an open fire or grill which includes a perforated spatula face, a removable handle with retractable supports that can easily be assembled/or disassembled. Options include a collapsible spatula face having a hinge, a nonstick cooking surface, a serrated cooking edge, and a telescopic handle that includes a spring for biasing the rod in an extended state and a detent for maintaining a retracted state.

23 Claims, 2 Drawing Sheets

COLLAPSIBLE GRILLING SPATULA

BACKGROUND OF THE INVENTION

The invention relates to a utensil for cooking over an open fire or grill, particularly while camping, backpacking or fishing. Space is of the essence for these activities. Other camping spatulas, such as the Fish and Asparagus Spatula sold by Amron, have permanent handles. However, they are bulky and difficult to pack when transporting camping or fishing gear.

The invention provides a collapsible spatula that can easily be assembled/disassembled, stored, and carried. It consists of a cooking surface and a removable handle.

BRIEF SUMMARY OF THE INVENTION

This invention provides a convenient collapsible cooking utensil for cooking over an open fire or grill. It includes a perforated spatula face, a removable handle with retractable supports that can easily be assembled/or unassembled and stored in a convenient carrying case.

DETAILED DESCRIPTION OF THE INVENTION

Figure 1:
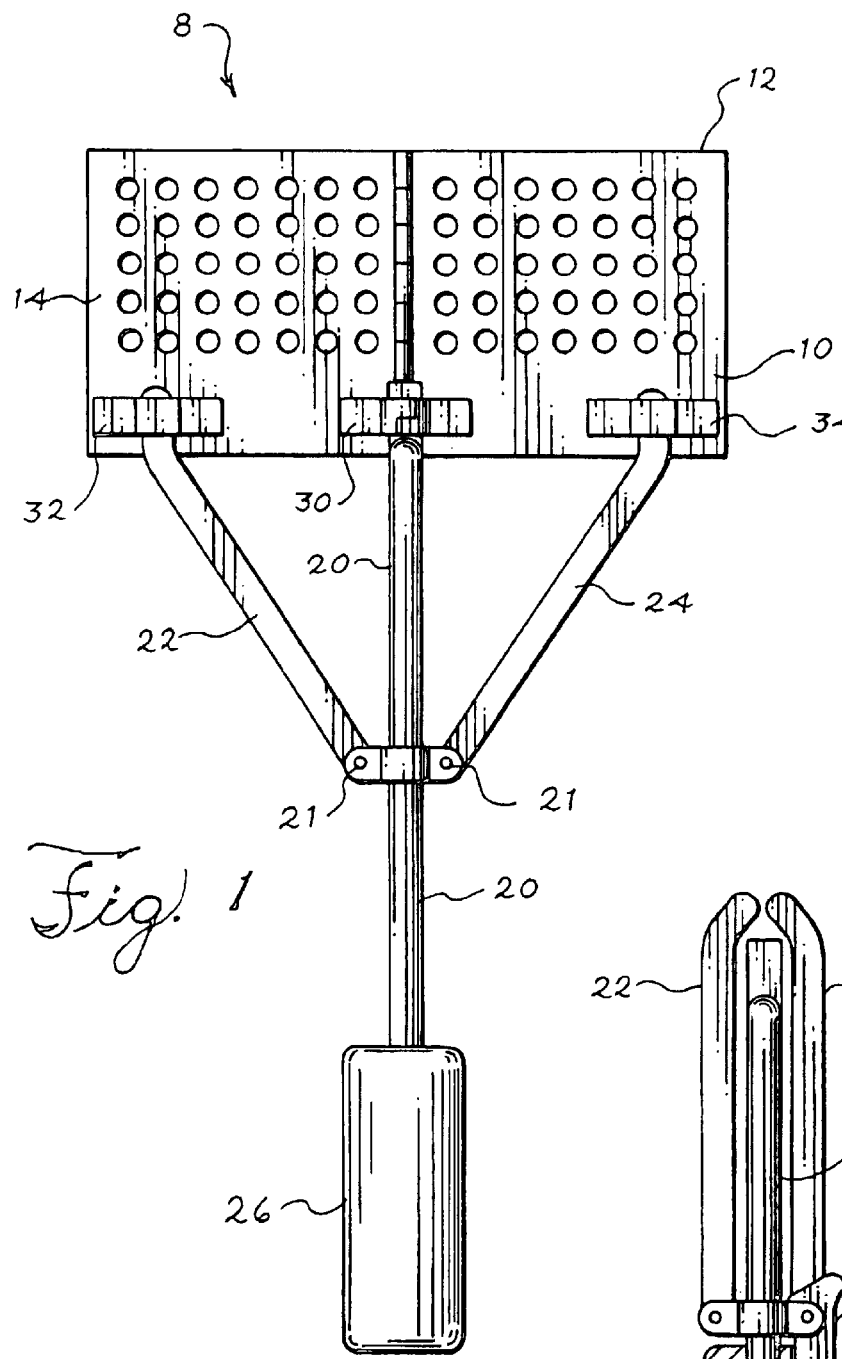
FIG. 1 is a bottom view of the assembled collapsible spatula.

As shown in FIG. 1, the spatula 8 includes a plate 10 having an upper surface 12 and a lower surface 14. The plate is removably connected to and supported by a central rod 20 and two support arms 22 and 24. The two support arms 22 and 24 are pivotally connected to the central rod 20 by rivets 21 or equivalent fasteners. The end of central rod 20 opposite the plate 10 is securely received by grip 26.

Figure 3:
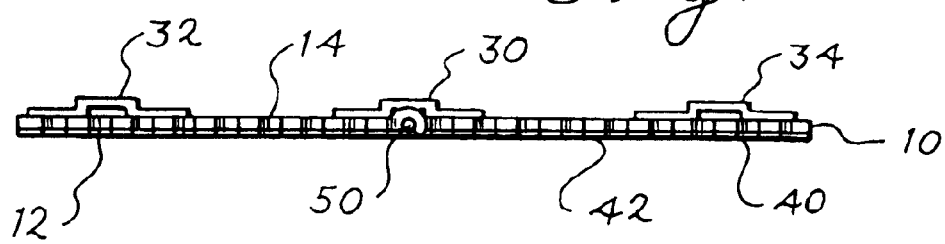
FIG. 3 is a side view of the spatula plate and the optional non-stick coating.
Figure 2:
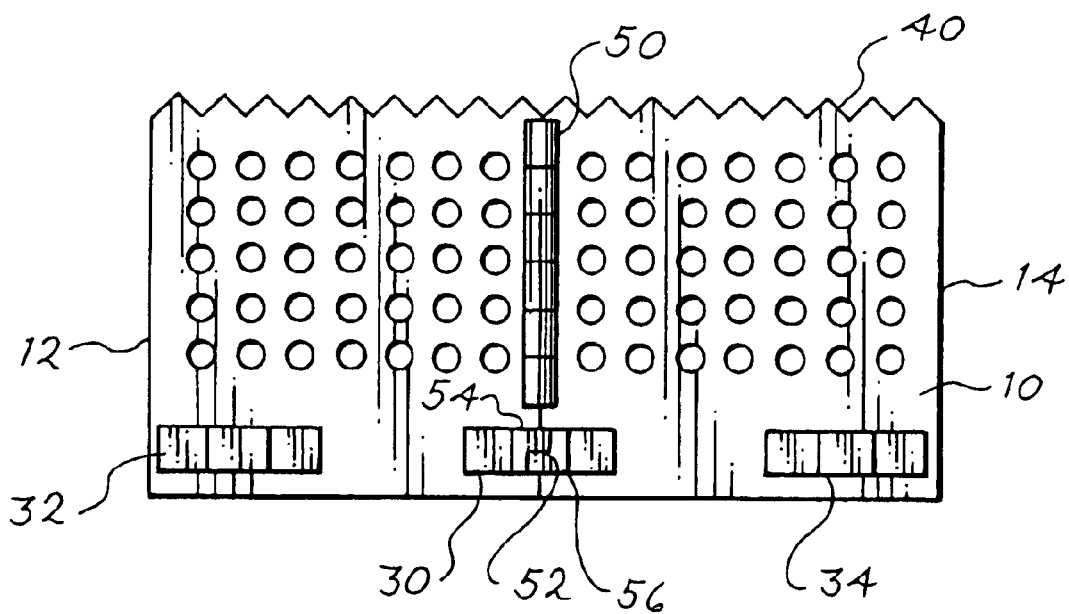
FIG. 2 depicts the three integral receptacles on the lower surface of the spatula plate and the optional serrated edge.

The central rod 20 and the two support arms 22 and 24 are received in the three receptacles 30, 32, and 34. As shown in FIGS. 2 and 3, the three receptacles 30, 32, 34 are preferably integrally formed on the lower surface 14 of plate 10. The rectangular receptacle shape depicted in FIG. 3 is only exemplary and any shape receptacle can be used provided the ends of the central rod 20 and support arms 22, 24 are of a complementary shape. Plate 10 includes an optional serrated edge 40 as shown in FIG. 2. The serrated edge functions as a cleaning tool for the cooking surface. Plate 10 may also include a hinge 50 which permits greater space savings. In a preferred embodiment, the hinge is located at the mid-point of the plate 10. In this configuration, one half of the middle receptacle is integrally formed on one half of the plate and half is formed on the other half of the plate. An exemplary parting line 52 is shown in FIG. 2, although any equivalent configuration may be used. As shown in FIG. 2 a tab 54 is integrally formed in the left half of the plate 10; tab 56 is integrally formed in the right half of plate 10. When the plate is in the assembled state, the two tabs 52, 54 combine to form the middle receptacle 30, which securely holds the central rod. As shown in FIG. 3, the plate 10, which is preferably made of stainless steel, can also include a layer of nonstick material 42 such as Teflon®.

Figure 4:
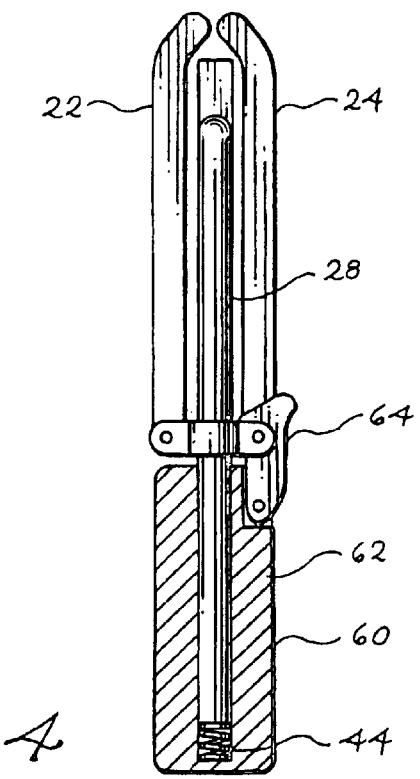
FIG. 4 depicts an alternative embodiment including a telescopic central rod in the extended state.

FIG. 4 depicts an alternative embodiment. In contrast to the one-piece central rod 20 depicted in FIG. 1, the spatula includes a central rod 28 consisting of telescoping segments. The grip 60 includes a cavity or central bore 62 for receiving the telescoping segments. In the preferred embodiment, the telescoping segments are spring loaded. A coil spring 44 urges the segments in to an extended state which is shown in FIG. 4. The spatula 10 also includes a latch or other detent mechanism for holding the handle in the retracted state, which is shown in FIG. 4. Preferably, the detent can be operated by a push button 64.

We claim:

1. A spatula comprising:
    a plate having an upper and lower surface, said lower surface having three integral receptacles;
    a handle comprising a central rod and two arms, said rod having a distal end and a proximal end, each of said arms having a first end pivotally connected to said rod at a point between said distal and proximal ends of said rod, said distal end of the rod and respective second ends of the arms adapted to be slidably received in the receptacles of said plate; and
    a grip having an internal cavity adapted to securely receive a portion of said proximal end of said rod wherein the edge of the said plate furthest from the handle is serrated.

2. The spatula of claim 1 wherein said upper surface of said plate is a layer of a nonstick material.

3. The spatula of claim 2 wherein said non-stick layer is Teflon.

4. The spatula of claim 1 wherein said central rod is telescopic.

5. A spatula comprising;
    a plate having an upper and lower surface, said lower surface having three integral receptacles;
    a handle comprising a central rod and two arms, said rod having a distal end and a telescopic proximal end, each of said arms having a first end pivotally connected to said rod at a point between said distal and proximal ends of said rod, said distal end of the rod and respective second ends of the arms adapted to be slidably received in the receptacles of said plate; and
    a grip having an internal cavity adapted to securely receive a portion of said proximal end of said rod, wherein said telescopic proximal end of said rod includes a spring for biasing the rod in an extended state.

6. The spatula of claim 5 wherein said upper surface of said plate is a layer of a nonstick material.

7. The spatula of claim 6 wherein said non-stick layer is Teflon.

8. The spatula of claim 5 wherein said telescopic rod includes a detent for maintaining the rod in a retracted state.

9. A spatula comprising:
    a plate having an upper and lower surface, said lower surface having three integral receptacles;
    a handle comprising a central rod and two arms, said rod having a distal end and a telescopic proximal end, each of said arms having a first end pivotally connected to said rod at a point between said distal and proximal ends of said rod, said distal end of the rod and respective second ends of the arms adapted to be slidably received in the receptacles of said plate; and a grip having an internal cavity adapted to securely receive a portion of said proximal end of said rod, wherein said telescopic proximal end of said rod includes a detent for maintaining the rod in a retracted state.

10. The spatula of claim 9 wherein said upper surface of said plate is a layer of a nonstick material.

11. The spatula of claim 9 wherein said upper surface of said plate includes a layer of Teflon.

12. The spatula of claim 9 wherein said telescopic rod includes a spring for biasing the rod in an extended state.

13. A spatula comprising:

two substantially identical plates, said plates connected by a hinge, each plate having a lower surface with en integral receptacle and a partial receptacle, wherein when said plates are arranged to form a plane, the partial receptacles form one receptacle;

a handle comprising a central rod and two arms, said rod having a distal end and a proximal end, said distal end of the rod and respective second ends of the arms adapted to be slidably received in the receptacles of said plate; and each of said arms having a first end pivotally connected to said rod at a point between said distal and proximal ends of said rod, said distal end of the rod and respective second ends of the arms adapted to be slidably received in the receptacles of said plates; and a grip having an internal cavity adapted to securely receive a portion of said proximal end of said rod.

14. The spatula of claim 13 wherein said upper surface of said plates is a layer of a nonstick material.

15. The spatula of claim 14 wherein said non-stick material is Teflon.

16. The spatula of claim 13 wherein the edges of the said plates that are furthest away from the handle is are serrated.

17. The spatula of claim 13 wherein said central rod is telescopic.

18. The spatula of claim 17 wherein said telescopic rod includes a spring for biasing the rod in an extended state and a detent for maintaining the rod in a retracted state.

19. A spatula comprising a plate having an upper and lower surface, said upper surface having a layer of nonstick material, said lower surface having three integral receptacles;

a handle comprising a plurality of telescoping segments forming a central rod, and two arms, said rod having a distal end and a proximal end, each of said arms having a first end pivotally connected to said rod, said distal end of the rod and respective second ends of the arms adapted to be slidably received in the receptacles of said plate; and a grip having an internal cavity adapted to securely receive a portion of said proximal end of said rod when said rod is extended, wherein the edge of said plate furthest away from said handle includes serrations.

20. A spatula comprising;

two substantially identical plates, said plates connected by a hinge, each of said plates having a lower surface having one integral receptacle and a partial receptacle, wherein when said plates are arranged to form a plane, the partial receptacles form one receptacle;

a handle comprising a central telescopic rod and two arms, said rod having a distal end and a proximal end, each of said arms having a first end pivotally connected to aid rod at a point between said distal and said proximal ends of said rod, said proximal end of the rod and second ends of the arms adapted to be slidably received in the receptacles of said plate; and a grip having an internal cavity adapted to securely receive a portion of said distal end of said rod.

21. The spatula of claim 20 wherein the upper surface of said plates is a layer of nonstick material.

22. The spatula of claim 20 wherein the edges of said plates that are furthest away from the handle includes serrations.

23. The spatula of claim 20 wherein said telescopic rod includes a spring for biasing the rod in an extended state and a detent for maintaining the rod in a retracted state.

* * * * *